No. 657,333. Patented Sept. 4, 1900.
S. E. CLAPP.
CLOD FENDER ADJUSTER.
(Application filed June 29, 1900.)
(No Model.)
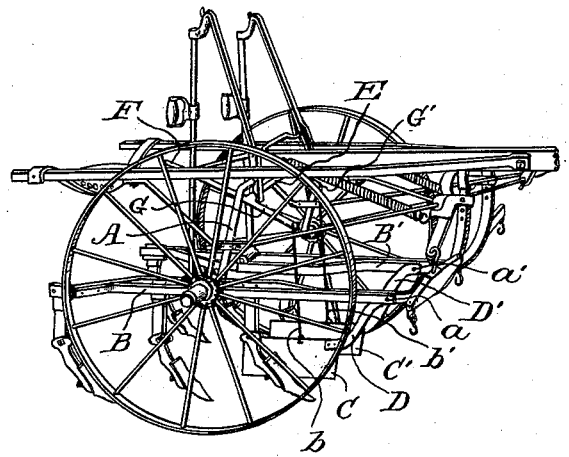
Fig. 1.
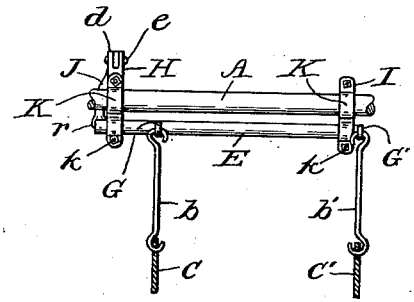
Fig. 2.
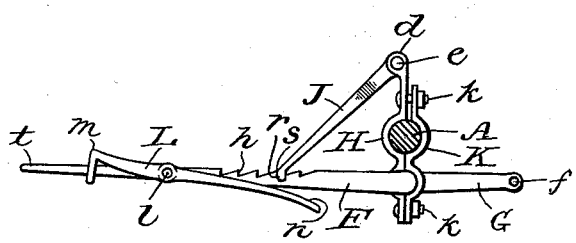
Fig. 3.
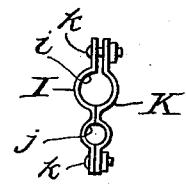
Fig. 4.
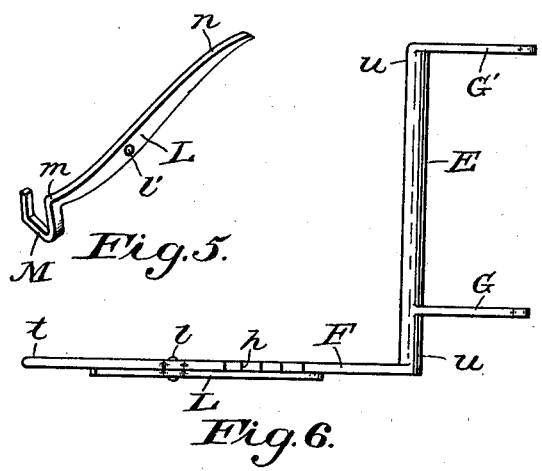
Fig. 5.
Fig. 6.
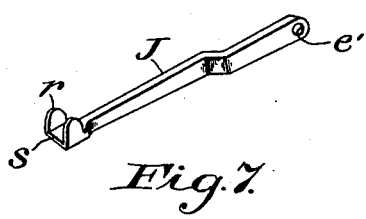
Fig. 7.
WITNESSES:
Wm H Payne
J F Webber
INVENTOR:
Samuel E. Clapp.
BY
E. T. Silvius,
ATTORNEY.
THE NORRIS PETERS CO., PHOTO-LITHO., WASHINGTON, D. C.

UNITED STATES PATENT OFFICE.

SAMUEL E. CLAPP, OF DECATUR COUNTY, INDIANA.

CLOD-FENDER ADJUSTER.

SPECIFICATION forming part of Letters Patent No. 657,333, dated September 4, 1900.

Application filed June 29, 1900. Serial No. 22,090. (No model.)

*To all whom it may concern:*

Be it known that I, SAMUEL E. CLAPP, a citizen of the United States, residing in the county of Decatur, in the State of Indiana, have invented a certain new and useful Clod-Fender Adjuster; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to appliances that are designed to be removably attached to the class of farm implements which are known as "cultivators," and has reference more particularly to means whereby the clod-fenders on such machines may be adjusted and manipulated so as to release clods that may become wedged between the shovels and the fenders.

Heretofore clod-fenders have been disadvantageously attached to the cultivator of the type shown herein, with the result in practice that clods become wedged between the shovel and the fender, which made it necessary to dislodge such clods in order to render the fender practicable, and this has been accomplished only by much loss of time and aggravating labor, it being necessary to punch out the clods by means of a pole or by the foot of the attendant.

My object is to eliminate such delays and extra labor and to provide fenders and appliances which may be readily controlled and adjusted to suit all requirements in operation, enabling the attendant to either elevate or depress the fenders to suit the character of the ground and crop being worked, and to elevate the fenders when desired, so as to be temporarily inoperative; and a further object is to provide appliances of this character which may be quickly detached when they are not required to be employed and when they might be obstructive.

With these objects in view my invention consists in fenders attached in a novel manner to the frame which carries the cultivator-shovels, in novel housings attachable to the cultivator-axle, a rock-shaft having lift-arms and a novel lever, a latch for the lever, and a novel latch-lifter; and the invention consists also in the parts and combination and arrangements of parts hereinafter particularly described, and pointed out in the claims.

Referring to the drawings, Figure 1 is a perspective view of a cultivator, showing my appliances connected therewith; Fig. 2, a front elevation of my appliances connected to a fragment of the cultivator-axle, the fenders being shown in transverse section; Fig. 3, a side elevation of the lever and a lift-arm and also the latch and the latch-lifter and the shaft-housing attached to the axle; Fig. 4, a side elevation of one of the detachable housings; Fig. 5, a perspective view of the latch-lifter; Fig. 6, a top plan view of the shaft and connections, and Fig. 7 a perspective view of the latch inverted.

Similar reference-letters in the several figures of the drawings designate similar parts.

In constructing cultivators of the type shown the axle A is so bent that the longitudinally-central portion is elevated considerably, so as to clear the cornstalks or other plants, and frames B B' are attached to the main parts and carry the cultivator shovels or plows, and it has been customary to attach clod-fenders detachably but non-adjustably to the frames B B'. In this form of construction the fenders cannot be either elevated or depressed to suit different depths of plowing, which is a disadvantage, nor can they be lifted out of the way when working portions of a field where the corn may be high and it may not be desirable to use the fenders, their function being to protect only the small and tender stalks from being covered or injured by clods or an excess of soil thrown over by the shovels, and, as is well known, the growth of the corn may vary in height. Therefore it is desirable that the larger growth should be banked up somewhat wherever it may be found large enough to require it. In practically carrying out my invention I provide two fenders C C', substantially alike, of sheet metal, to each of which is secured rigidly a curved arm D or D', which may be suitably bent, so that the fender which it supports at its forward end may sit in a proper position relatively to a forward shovel and with respect to the row of corn hills. The free ends of the arms are pivoted to the frames B B' by means of pivot-bolts a a', placed somewhat forward of the positions that it is desired that the fenders shall occupy, so that when the rear ends of the fenders are elevated the forward ends thereof may also rise nearly to the same degree in order that they may rise bodily above the height of shovels. In such positions the earth thrown aside by the shovels may fall below the fenders.

A pair of suitable housings are detachably secured rigidly to the higher portion of the axle A and rotatively support a shaft E, having an integral lever F and a pair of lift-arms G G' extending from the shaft oppositely from the lever, the lever being situate at one end and an arm at the opposite end of the shaft and the other arm near the lever. At the extremity of each arm is an eye f, to which a link b or b' is connected, the pair of links being connected also to the fenders C C' and supporting them, together with their pivoted arms aforesaid. The housings may be variously designed, being preferably composed of but two principal parts H and K for the main housing, which supports the shaft adjacent to the lever F, and two parts I and K for carrying the opposite end of the shaft. The parts H and I may be made of cast metal most suitably, while the parts or caps K K may be made of wrought or malleable metal and may be exactly alike. The part I is similar to the part K, these two being bolted together at their ends by screw-bolts k, the upper ends being slightly apart, so as to insure a binding pressure against the axle, which occupies an opening i, formed between the two parts. The shaft E may rotate in an opening j, formed as a journal-bearing below the other opening, also between the two parts of the housing. The other housing is formed the same as the one described, except that the part H projects above the part K and has an ear or pair of ears d, in which is pivoted a latch J by means of a pivot-pin e, the latch extending downwardly and engaging the top of the lever F. The shaft E has cylindrical portions, forming journals at u u, where it works in the bearings in the housings. Thus the arms G G' extend forward of the axle A, while the lever F extends rearwardly therefrom and to a point within reach of an operator, whether upon a riding or a walking cultivator.

The latch J operates as a pawl and at one end has a pivot-hole e', engaged by the pin e, and at its opposite end it has depending guide-lugs r at either side, between which its broad ends rides upon the lever F and also rest in any one of the notches h, which are formed in the upper side of the lever at suitable distances from the shaft E.

The latch-lifter L has a pivot-hole l' somewhat near its longitudinal center, by which it is connected pivotally to one side of the lever F by a pivot-pin l. The shorter end taken from the pivot-hole is designed for its handle and normally is elevated above the top of the lever, so that the operator's thumb may press upon it at the end m, and a hook M extends downward and under the lever, so as to limit the upward movement of the lifter-handle. The longer opposite end of the lifter has a smooth upper surface n extending along the sides of the teeth, so that the free end of the latch may slide thereon, and this end of the lifter is the heavier, so as to overbalance the opposite end.

In practical use the lever F should be grasped at the handle t, and, forcing it downward, the fenders may be elevated, the latch J automatically dropping into a notch h and retaining the lever F where placed, the weight of the fenders causing the lever to be held against the latch. To depress the fenders, press both upon the lever F and the end m of the lifter L, when the latch will be released from the notch and be elevated upon the lifter. Then the end of the lever may be raised to the desired position and the latch be again allowed to drop into a notch. Thus by proper manipulation the fenders may be quickly adjusted while in operation. They may be thrown up instantly to release a clod, or they may be elevated to inoperative positions and there retained, and when not at all required the fenders and the whole appliance may be removed from the machine.

Having thus described my invention, what I claim, and desire to secure by Letters Patent, is—

1. In a cultivator, the combination of pivoted clod-fenders, a rocking shaft having lift-arms, links connecting the fenders with the lift-arms, a lever attached to the rocking shaft, and a latch for the lever.

2. In a cultivator, the combination with a frame thereof, of clod-fenders having each an arm pivoted at its free end to such frame, a rocking shaft having lift-arms, links connecting the lift-arms and the fenders, a lever attached to the rocking shaft, and a latch for the lever.

3. In a cultivator, the combination with pivoted clod-fenders carried at their forward ends by a frame of the cultivator, of a rocking shaft suitably supported and having lifting-arms, links connecting the lifting-arms and the fenders, a lever secured to the rocking shaft and having notches in the upper edge or face thereof, a pivoted latch riding at its free end upon the lever so that a notch may be engaged thereby, and a latch-lifter pivoted at one side of the lever whereby the free end of the latch may be carried while shifting the lever so that other notches may be engaged by the latch.

4. In a cultivator, the combination with the frames B, B', of the arms D, D'; the pivot-bolts a, a', connecting said arms pivotally to said frames; the fenders rigidly attached to said arms; the housings suitably supported; the rocking shaft having the lift-arms and mounted in said housings; the links connected to said arms and to said fenders; the lever attached to said shaft; the latch engaging said lever; and the latch-lifter pivoted to said lever.

5. In a cultivator, the combination with the adjustable fenders and the cultivator-axle, of the detachable housings secured to said axle, the rocking shaft journaled in said housings, the forwardly-extending lift-arms secured to said shaft, the links connected at their upper ends to said arms and at their lower ends to said fenders, the rearwardly-extending lever secured to said shaft, the notches at the top of said lever, the latch pivoted to one of said housings and engaging either one of said notches, and the latch-lifter pivoted at one side of said lever and extending along the sides of said notches below the engaging end of said latch, substantially as set forth.

6. In a cultivator, the combination of the pivoted fenders, the housings, the rocking shaft, the lift-arms, the links connecting the lift-arms with the fenders, the notched operating-lever, the lever-latch having one end riding upon the lever, and the latch-lifter pivoted at the side of said lever and having the hook extending below and across the under side of said lever, substantially as set forth.

In testimony whereof I affix my signature in presence of two witnesses.

SAMUEL E. CLAPP.

Witnesses:
J. TALMAGE CLAPP,
SHERMAN BLINE.